United States Patent [19]

Tanaka et al.

[11] Patent Number: 5,178,897
[45] Date of Patent: Jan. 12, 1993

[54] WATER-IN-OIL EMULSION COMPOSITION FOR BAKERY

[75] Inventors: Shinji Tanaka; Yasuo Okutomi; Amane Endo, all of Tokyo, Japan

[73] Assignee: Asahi Denka Kogyo Kabushiki Kaisha, Tokyo, Japan

[21] Appl. No.: 767,834

[22] Filed: Sep. 30, 1991

[30] Foreign Application Priority Data

Oct. 4, 1990 [JP] Japan .................. 2-267427

[51] Int. Cl.$^5$ ............................................. A23D 7/00
[52] U.S. Cl. .................................. 426/602; 426/601
[58] Field of Search .............................. 426/601, 602

[56] References Cited

U.S. PATENT DOCUMENTS

| | | | |
|---|---|---|---|
| 3,519,436 | 7/1970 | Bauer et al. | |
| 3,671,459 | 6/1972 | Norris | 426/602 |
| 3,679,430 | 7/1972 | Birnbaum | 426/602 |
| 3,917,859 | 11/1975 | Terada | 426/602 |
| 3,939,290 | 2/1976 | Terada | 426/602 |
| 4,389,426 | 6/1983 | Reissman | 426/602 |
| 4,521,440 | 6/1985 | Lansbergen | 426/602 |
| 4,818,553 | 4/1989 | Holscher | 426/602 |

FOREIGN PATENT DOCUMENTS

| | | | |
|---|---|---|---|
| 0063389 | 2/1981 | European Pat. Off. | 426/602 |
| 0265978 | 5/1988 | European Pat. Off. | 426/602 |
| 46-5023 | 2/1971 | Japan . | |
| 61-268134 | 11/1986 | Japan | 426/602 |
| 63-301743 | 12/1988 | Japan . | |
| 2-20247 | 1/1990 | Japan | 426/602 |
| 2-268634 | 11/1990 | Japan | 426/602 |
| 2182942 | 5/1987 | United Kingdom | 426/602 |

Primary Examiner—Carolyn Paden
Attorney, Agent, or Firm—Young & Thompson

[57] ABSTRACT

The water-in-oil emulsion composition for bakery of the present invention comprises from 30 to 70% by weight of an oil and fat phase containing a fat showing a SFC of 30 or above, 20 or above and 10 or above, respectively, at 10° C., 20° C. and 30° C. and from 70 to 30% by weight of an aqueous phase containing a hydrated emulsifier and contains a monoglyceride containing from 5 to 100% by mole of transmonoenoic acid(s) in the constituting fatty acids and a sizing agent.

4 Claims, No Drawings

WATER-IN-OIL EMULSION COMPOSITION FOR BAKERY

BACKGROUND OF THE INVENTION

1. Field of the Invention

This invention relates to a water-in-oil emulsion composition for bakery. More particularly, it relates to a water-in-oil emulsion composition for bakery, wherein an extremely high emulsion stability and a high proportion of aqueous phase can be achieved, capable of giving a product having an excellent flavor, a soft texture and a good meltability in mouth when used in, particularly, baked products.

2. Description of the Prior Art

In recent years, it has been required to develop an oil and fat composition for bakery of a high water content from various viewpoints, for example, from the nutritional viewpoint and in order to give baked products having a goods texture.

A known method for producing a table margarine of a high water content comprises using an unsaturated monoglyceride as an emulsifier (refer to Japanese Patent Publication No. 5023/1971). The unsaturated monoglyceride to be used as an emulsifier in this method substantially consists of cis-form unsaturated fatty acids, which will be referred to as the cis-unsaturated monoglyceride hereinafter. This method is based on the fact that the cis-unsaturated monoglyceride can form rigid liquid crystals at the W/O emulsion interface.

On the other hand, an oil and fat composition of a high water content should have a plasticity over a wide temperature range, when the purposes of its use are taken into consideration. Regarding the oil and fat composition, therefore, those having a considerably high solid fat content (SFC) are to be blended, different from the above-mentioned table margarine of a high water content. This is because plasticity is indispensable in order to uniformly incorporate an oil and fat composition of a high water content into, for example, a bread dough, a cookie dough or a cake dough. A stable W/O emulsion, similar to a conventional table margarine of a high water content, can be obtained by producing an oil and fat composition of a high water content by blending a conventional cis-unsaturated monoglyceride with a base comprising a fat composition of a high SFC. In this W/O emulsion, however, high melting point fats in the fat composition are intensely incorporated into liquid crystals in the production process. As a result, no plasticity over a wide temperature range can be achieved and therefore the obtained product shows only a seriously deteriorated suitability for producing baked products.

The deterioration of the plasticity is also observed in a fat emulsion comprising a diglyceride having unsaturated fatty acid residues (refer to Japanese Patent Publication No. 301743/1988), which suggests that it is due to a specific function of cis-unsaturated fatty acids.

SUMMARY OF THE INVENTION

It is an object of the present invention to provide a water-in-oil emulsion composition for bakery, wherein an extremely high emulsion stability and a high proportion of aqueous phase can be achieved, capable of showing a plasticity over a wide temperature range.

In order to achieve the above object, the present inventors have examined the effects of a saturated monoglyceride, a cis-unsaturated monoglyceride and a trans-unsaturated monoglyceride on the emulsion stability and plasticity of an emulsion composition of a high water content comprising fats of a high SFC as well as the effects of a sizing agent thereon. Based on the results of the examination, which are given in Table 1, the following findings are obtained.

The saturated monoglyceride does not contribute at all to the emulsion stability of the emulsion composition of a high water content comprising fats of a high SFC, regardless of the presence of the sizing agent in the aqueous phase, but it gives a good plasticity.

The cis-unsaturated monoglyceride shows stable emulsion regardless of the presence of the sizing agent in the aqueous phase, but the plasticity is not improved thereby.

When no sizing agent is used in the aqueous phase, the trans-unsaturated monoglyceride shows a poor emulsion stability. When the sizing agent is employed, it gives a high emulsion stability and a good plasticity.

TABLE 1

|  | Emulsion stability | Plasticity |
|---|---|---|
| Using no sizing agent: |  |  |
| saturated monoglyceride | x | o |
| cis-unsaturated mono-glyceride | o | x |
| trans-unsaturated mono-glyceride | x | o |
| Using sizing agent: |  |  |
| saturated monoglyceride | x | o |
| cis-unsaturated mono-glyceride | o | x |
| trans-unsaturated mono-glyceride | o | o |

The present inventors have furthermore found out that the dispersibility of the water-in-oil emulsion composition in water or a dough can be improved by adding the hydrate of an emulsifier to the aqueous phase and thus the effects of the water-in-oil emulsion composition for producing baked products can be remarkably improved.

Accordingly, the present invention, which has been completed based on the aforesaid findings, provides a water-in-oil emulsion composition for bakery which comprises from 30 to 70% by weight of an oil and fat phase comprising a fat showing a solid fat content of 30 or above, 20 or above and 10 or above, respectively, at 10° C., 20° C. and 30° C. and from 70 to 30% by weight of an aqueous phase containing a hydrated emulsifier and contains a monoglyceride containing from 5 to 100% by mole, based on the constituting fatty acids, of trans-monoenoic acid(s) (hereinafter referred to as the trans-unsaturated monoglyceride) and a sizing agent.

The water-in-oil emulsion composition of the present invention, wherein an extremely stable emulsion and a high proportion of the aqueous phase (for example, a water content of 50% by weight or more) can be achieved, sustains a plasticity over a wide temperature range and thus can be suitably used as an emulsion composition for producing, in particular, baked products.

The use of the emulsion composition of the present invention for kneading can exerts the following remarkable effects.

(1) The handling properties of a bread or cake dough can be improved.

(2) The water in a bread or cake dough can be maintained, which contributes to the softening of gluten.
(3) The obtained bread can sustain a softness for a prolonged period of time.
(4) The specific volume of a bread or a cake can be elevated.
(5) The obtained bread or cake shows a good meltability in mouth.

DETAILED DESCRIPTION OF THE INVENTION

Although the carbon atom number of the constituting fatty acids of the trans-unsaturated monoglyceride to be used in the present invention is not particularly restricted, those having 12 to 24 carbon atoms may be generally used therefor. A fatty acid constituting an unsaturated monoglyceride is substantially a monoenoic acid, either cis- or trans- form. The aforesaid trans-unsaturated monoglyceride contains from 5 to 100% by mole, preferably from 10 to 70% by mole and still preferably from 15 to 70% by mole, of trans-monoenoic acid(s) in the total constituting fatty acids. When the monoglyceride contains less than 5% by mole of a trans-monoenoic acid and thus substantially comprises cis-unsaturated fatty acids, it gets close to a cis-unsaturated monoglyceride. In this case, therefore, the plasticity of the monoglyceride is seriously deteriorated, though the emulsion stability thereof can be secured.

Well-known methods for determining the proportion of trans-monoenoic acid(s) in the constituting fatty acids include IR and gas chromatography.

The content of the trans-unsaturated monoglyceride in the composition may range from 0.1 to 2.0% by weight, preferably from 0.5 to 2.0% by weight and still preferably from 0.7 to 1.5% by weight, though it may vary depending on the content of the trans-monoenoic acid(s). When the content of the trans-unsaturated monoglyceride is less than 0.1% by weight, any sufficient emulsion stability can be hardly achieved. When it exceeds 2.0% by weight, on the other hand, there is a risk that the plasticity is deteriorated, which might be caused by the cis-unsaturated monoglyceride contained therein.

Preferable examples of the sizing agent to be used in the present invention include starch, guar gum, carrageenan, alginates and pectin. Either one of these materials or a mixture thereof may be used in the present invention.

The content of the sizing agent in the composition may range from 0.1 to 10.0% by weight, preferably from 0.3 to 5.0% by weight and still preferably from 0.5 to 2.0% by weight. When the content of the sizing agent is less than 0.1% by weight, satisfactory effects can be hardly achieved. When it exceeds 10.0% by weight, on the other hand, the viscosity of the aqueous phase might be excessively increased or the obtained product might show a rough texture.

Examples of the fat to be used in the present invention include natural fats such as palm oil, soybean oil, rapeseed oil, rice oil, sunflower oil, safflower oil, beef tallow, milk fat, lard, cacao fat, fish oil and whale oil and processed ones obtained by hydrogenating, fractionating and/or transesterifying these fats. Either one of these materials or a mixture thereof may be used in the present invention.

It is required that the SFC of the mixture of the selected fats be 30% or above, 20% or above and 10% or above, respectively, at 10° C., 20° C. and 30° C. This is because the composition should have a good plasticity over a wide temperature range. In the case of a table margarine of SFC of 24, 13 and 4, respectively, at 10° C., 20° C. and 30° C., for example, oil-off is observed at a temperature exceeding 25° C. and thus the plasticity essentially required for an emulsion composition cannot be satisfied any more. This phenomenon well explains the above-mentioned fact.

The fat(s) may be used in such an amount as to give a content of the oil and fat phase, together with other oleaginous materials, in the composition of from 30 to 70% by weight.

In addition to the trans-unsaturated monoglyceride, the oil and fat phase of the emulsion composition of a high water content of the present invention may further contain other emulsifier(s) (for example, saturated monoglycerides, diglycerides, sucrose fatty acid esters, sorbitan fatty acid esters, propylene glycol fatty acid esters, organic acid monoglycerides or lecithin), antioxidant(s), colorant(s) and perfume(s). It is preferable that the content of the above-mentioned emulsifier(s) and other additives in the oil and fat phase ranges from 0.1 to 10% by weight based on the oil and fat phase.

The emulsion composition of a high water content of the present invention contains a hydrated emulsifier (a hydrate of an emulsifier) in the aqueous phase.

Examples of the emulsifier to be hydrated include saturated and unsaturated fatty acid monoglycerides, diacetyltartaric acid monoglyceride, succinic acid monoglyceride, citric acid monoglyceride, lactic acid monoglyceride, acetic acid monoglyceride, diglycerides, polyglycerol fatty acid esters, propylene glycol fatty acid esters, sugar esters and sugar polyesters. Among these materials, monoglycerides, diacetyltartaric acid monoglyceride, succinic acid monoglyceride and polyglycerol fatty acid esters are particularly preferable. Either one of these emulsifiers or a mixture thereof may be used in the present invention.

Although the chain length (i.e., the carbon atom number) of the fatty acids constituting the above emulsifier is not particularly restricted, those having 12 to 24 carbon atoms may be generally used therefor.

The content of the emulsifier to be hydrated in the composition may range from 0.05 to 35% by weight, preferably from 0.1 to 20% by weight. when the content of the emulsifier is less than 0.05% by weight, satisfactory baking effects can be hardly achieved in the production of bread. When it exceeds 35% by weight, on the other hand, the baking effects cannot be improved any more.

In the emulsifier hydrate, hydrophilic groups are aligned toward the surface. Thus the dispersibility of the emulsifier in water or a dough is improved as compared with a common emulsifier having lipophilic surface, which contributes to a remarkable improvement in the baking effects of the water-in-oil emulsion composition.

The aqueous phase of the emulsion composition of a high water content of the present invention may further contain dairy products (for example, milk, whole fat milk, skimmilk, proteins derived from milk such as casein compounds, a concentrated solution of milk protein, a milk serum protein concentrate or mixtures thereof), common salt, water-soluble perfumes, sugars (for example, sucrose, isomerizing sugars or invert sugars), puree or juice of fruits or vegetables, concentrates thereof and lactic acid fermentation products thereof as seasoning components, if required.

Furthermore, enzymes such as proteases (for example, pepsin, trypsin, chymotrypsin, papain or ficin), glycosidases (for example, α-amylase, β-amylase, amyloglucosidase, pullulanase or pentosanase), lipid decomposing enzymes (for example, lipase or phospholipase), catalase and glucose oxidase may be added to the water-in-oil emulsion composition of the present invention.

Furthermore, a gas (for example air, nitrogen gas or carbon dioxide) may be introduced into the emulsion composition of a high water content of the present invention during or after the production, if required.

The method for producing the emulsion composition of a high water content of the present invention is not particularly restricted. It may be obtained by, for example, the following method. 30 to 70% by weight of an oil and fat phase, which has been prepared by dissolving a trans-unsaturated monoglyceride optionally together with other oleaginous material(s) in a fat, and 70 to 30% by weight of an aqueous phase, which has been prepared by adding sizing agent(s), emulsifier(s) to be hydrated and water-soluble material(s), if required, in water, are pre-emulsified so as to give a W/O emulsion. In this step, the mixture may be emulsified and homogenized while circulating with a pump by using, for example, a homomixer, a homogenizer or a colloid mill. Next, the pre-emulsion is quenched and kneaded in a hermetically sealed continuous tube cooler such as those used for producing margarine (for example, votator, combinator or perfecter) to thereby give the fat composition of the present invention.

The emulsion composition of a high water content of the present invention thus obtained is free from the problem of the plasticity over a wide temperature range which has been a trouble in the art. Further, it shows a highly stable emulsification.

The emulsion composition of a high water content of the present invention is usable in various foods including bread such as white bread, buns and French bread and confectioneries such as biscuits, cookies and crackers. When it is used in bread, in particular, the obtained product has an excellent flavor and a soft and crisp texture.

The emulsion composition of a high water content of the present invention may be used in the same manner as that of conventional emulsion compositions. It may be used in an amount falling within the conventional range. For example, it may be kneaded into a bread dough at a ratio of 20% by weight or less based on flour. Similarly, it may be kneaded into a cake dough at a common ratio.

To further illustrate the present invention, the following Examples, Comparative Examples and Application Examples will be given wherein all parts and % are by weight unless otherwise noted.

EXAMPLES 1 TO 6 AND COMPARATIVE EXAMPLES 1 TO 4

In accordance with each formulation as specified in Table 2, an emulsion composition of a high water content was obtained by the following method.

The fat and the emulsifier were introduced into a mixing tank together and homogeneously dissolved or dispersed therein by heating at around 60° C. to thereby give an oil and fat phase. Separately, the sizing agent and the emulsifier to be hydrated were added into water and heated to a suitable temperature to thereby give an aqueous phase. The above-mentioned aqueous phase was added to the above-mentioned oil and fat phase and the obtained mixture was homogenized by uniformly stirring. Thus a W/O emulsion was obtained. The obtained emulsion was quenched and kneaded in a device for producing margarine to thereby give an emulsion composition of a high water content. As Table 2 shows, a saturated monoglyceride or a cis-unsaturated monoglyceride was used as an emulsifier or no sizing agent was employed in Comparative Examples.

The texture state (emulsion stability and plasticity) of each emulsion composition of a high water content thus obtained was evaluated after storing at 10° C. and 30° C. for three days.

Table 3 summarizes the results.

TABLE 2

| | Emulsifier | | Sizing agent | | Emulsifier to be hydrated | | Fat (%) hardened fish oil 32° C. | palm oil 42° C. | Water (%) | SFC (fat) | | |
|---|---|---|---|---|---|---|---|---|---|---|---|---|
| | type | cont. (%) | type | cont. (%) | type | cont. (%) | | | | 10° C. | 20° C. | 30° C. |
| Example | | | | | | | | | | | | |
| 1 | t$_1$-UMG | 1.2 | starch | 1.3 | saturated monoglyceride | 1.5 | 30 | 13 | 53.0 | 45 | 32 | 19 |
| 2 | t$_1$-UMG | 1.2 | carrageenan | 1.3 | saturated monoglyceride | 1.5 | 30 | 13 | 53.0 | 45 | 32 | 19 |
| 3 | t$_2$-UMG | 1.2 | starch | 1.3 | saturated monoglyceride | 1.5 | 30 | 13 | 53.0 | 45 | 32 | 19 |
| 4 | t$_2$-UMG | 1.2 | starch | 1.3 | diacetyltartaric acid monoglyceride | 1.5 | 30 | 13 | 53.0 | 45 | 32 | 19 |
| 5 | t$_2$-UMG | 1.2 | starch | 1.3 | succinic acid monoglyceride | 1.5 | 30 | 13 | 53.0 | 45 | 32 | 19 |
| 6 | t$_2$-UMG | 1.2 | starch | 1.3 | polyglycerol fatty acid ester | 1.5 | 30 | 13 | 53.0 | 45 | 32 | 19 |
| Comparative Example | | | | | | | | | | | | |
| 1 | SMG | 1.2 | starch | 1.3 | saturated monoglyceride | 1.5 | 30 | 13 | 53.0 | 45 | 32 | 19 |
| 2 | C-UMG | 1.2 | starch | 1.3 | saturated monoglyceride | 1.5 | 30 | 13 | 53.0 | 45 | 32 | 19 |
| 3 | t$_1$-UMG | 1.2 | — | | saturated monoglyceride | 1.5 | 30 | 13 | 53.0 | 45 | 32 | 19 |
| 4 | t$_2$-UMG | 1.2 | — | | saturated | 1.5 | 30 | 13 | 53.0 | 45 | 32 | 19 |

TABLE 2-continued

| Emulsifier | | Sizing agent | | Emulsifier to be hydrated | | Fat (%) | | Water | SFC (fat) | | |
|---|---|---|---|---|---|---|---|---|---|---|---|
| | | | | | | hardened | palm | | | | |
| | cont. | | cont. | | cont. | fish | oil | | | | |
| type | (%) | type | (%) | type | (%) | oil 32° C. | 42° C. | (%) | 10° C. | 20° C. | 30° C. |
| | | | | monoglyceride | | | | | | | | t₁-UMG: unsaturated monoglyceride (trans-monoenoic acid content: 10% by mole, cis-monoenoic acid content: 50% by mole).
t₂-UMG: unsaturated monoglyceride (trans-monoenoic acid content: 30% by mole, cis-monoenoic acid content: 40% by mole).
C-UMG: unsaturated monoglyceride (cis-monoenoic acid content: 80% by mole, trans-monoenoic acid content: 0% by mole).
SMG: saturated monoglyceride.

TABLE 3

| | Texture after storing at 10° C. for 3 days | Texture after storing at 30° C. for 3 days |
|---|---|---|
| Example: | | |
| 1 | smooth, homogeneous and no water separation. | smooth and homogeneous. |
| 2 | smooth, homogeneous and no water separation. | smooth and homogeneous. |
| 3 | very smooth and homogeneous and no water separation. | very smooth and homogeneous. |
| 4 | very smooth and homogeneous and no water separation. | very smooth and homogeneous. |
| 5 | very smooth and homogeneous and no water separation. | very smooth and homogeneous. |
| 6 | very smooth and homogeneous and no water separation. | very smooth and homogeneous. |
| Comparative Example: | | |
| 1 | water separation. | good shape retention. |
| 2 | smooth, homogeneous and no water separation. | poor shape retention and oil-off. |
| 3 | water separation. | good shape retention. |
| 4 | water separation. | good shape retention. |

As Table 3 shows, the emulsion composition of a high water content of the present invention showed highly stable emulsification and a good plasticity, namely, excellent properties.

APPLICATION EXAMPLE 1

White bread baking test

White bread test samples of the following formulation were produced by the following method with the use of the emulsion compositions of a high water content obtained in Examples 1 and 5 (invention products) as an emulsion composition for bread dough.

| <Formulation> | parts |
|---|---|
| wheat flour | 1,000 |
| yeast | 23 |
| refined white sugar | 50 |
| food | 1 |
| emulsion composition | 50 |
| milk powder | 20 |
| common salt | 20 |
| water | 630. |

| <Production method> (70% sponge dough method) | |
|---|---|
| dough temperature | |
| sponge dough: | 24° C. |
| dough: | 28° C. |

| <Production method> (70% sponge dough method) | |
|---|---|
| floor time | 20 minutes |
| bench time | 25 minutes |
| final proofing | 40° C., 50 minutes |
| baking | 210° C., 23 minutes. |

Separately, comparative white bread samples of the same formulation were produced by the same method except that shortening (containing 2% of saturated monoglyceride) and a common emulsion composition (water content: 18%, saturated monoglyceride content: 1.5%) were used as an emulsion composition. In these comparative samples, the amounts of the emulsion compositions and water were finely controlled so as to give the same water content and the same fat content as those of the test samples.

Table 4 shows the results of the examination on these white bread samples wherein the hardness and flavor of each bread sample were evaluated as follows:

*1: the hardness of a sample was determined by measuring the load required for compressing the bread sample of 30 mm in thickness by 15 mm with a rheomether (mfd. by FUDO KAGAKU K.K.)

*2 the flavor of a sample was evaluated by 20 panelists. Each item was evaluated in five grades of from 1 (poor) to 5 (very good) and expressed in the average.

TABLE 4

| | Invention product | | Short- | Common knead-in |
|---|---|---|---|---|
| Test item | Ex. 1 | Ex. 5 | ening | fat |
| Specific volume | 5.13 | 5.08 | 4.90 | 4.95 |
| Hardness (compression ratio: 50%, sample thickness: 30 mm) | | | | |
| after 24 hr | 29.8 | 34.1 | 44.3 | 40.2 |
| after 48 hr | 38.4 | 43.1 | 60.5 | 52.7 |
| after 72 hr | 40.9 | 46.7 | 71.3 | 55.8 |
| Flavor test (evaluated by 20 panelists in 5 grades) | | | | |
| softness | 4.9 | 4.7 | 3.5 | 4.2 |
| meltability in mouth | 4.3 | 4.3 | 3.9 | 3.8 |
| total evaluation | 4.6 | 4.5 | 3.7 | 4.0 |

As Table 4 shows, the bread samples produced by using the invention products as an emulsion composition showed a sustained softness and a good meltability in mouth.

The results of a test wherein the water-in-oil emulsion composition of the present invention was used as an emulsion composition for producing white bread is given as an example of the application thereof to the production of baked products. However the water-in-oil emulsion composition of the present invention is applicable to the production of not only white bread but also various bread products and cakes. It is particularly effective to use the water-in-oil emulsion composition for producing bread products which would be deteriorated within a relatively short period of time, for example, raisin bread.

What is claimed is:

1. A water-in-oil emulsion composition for bakery which comprises from 30 to 70% by weight of an oil and fat phase containing a fat showing a SFC of 30 or above, 20 or above and 10 or above, respectively, at 10° C., 20° C. and 30° C. and from 70 to 30% by weight of an aqueous phase containing a hydrated emulsifier and contains a monoglyceride containing from 5 to 100% by mole of trans-monoenoic acid(s) in the constituting fatty acids and a sizing agent.

2. A water-in-oil emulsion composition for bakery as claimed in claim 1 which contains from 0.1 to 2.0% by weight of said monoglyceride containing 5 to 100% by mole of trans-monoenoic acid(s) in the constituting fatty acids.

3. A water-in-oil emulsion composition for bakery as claimed in claim 1 which contains from 0.1 to 10.0% by weight of a sizing agent.

4. A water-in-oil emulsion composition for bakery as claimed in claim 1 which contains 50% by weight or more of water.

* * * * *